United States Patent
Laird et al.

(10) Patent No.: US 10,195,919 B2
(45) Date of Patent: *Feb. 5, 2019

(54) ADJUSTABLE BLOW-OFF SUSPENSION

(71) Applicant: Fox Factory, Inc., Scotts Valley, CA (US)

(72) Inventors: Andrew Laird, Los Gatos, CA (US); Robert C. Fox, Scotts Valley, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/374,932

(22) Filed: Dec. 9, 2016

(65) Prior Publication Data

US 2017/0087953 A1    Mar. 30, 2017

Related U.S. Application Data

(63) Continuation of application No. 14/804,512, filed on Jul. 21, 2015, now Pat. No. 9,517,675, which is a (Continued)

(51) Int. Cl.
*B60G 17/08* (2006.01)
*B60G 15/12* (2006.01)
(Continued)

(52) U.S. Cl.
CPC .............. *B60G 17/08* (2013.01); *B60G 13/08* (2013.01); *B60G 15/12* (2013.01); *B62K 25/06* (2013.01); *B62K 25/28* (2013.01); *B62K 25/283* (2013.01); *F16F 9/065* (2013.01); *F16F 9/446* (2013.01); *F16F 9/466* (2013.01); *B60G 2202/314* (2013.01); *B60G 2300/12* (2013.01); *B60G 2500/11* (2013.01); *B60G 2800/162* (2013.01); *B62K 2025/048* (2013.01); *F16F 2228/066* (2013.01)

(58) Field of Classification Search
CPC .. B60G 17/08; B60G 13/08; B60G 2202/314; B60G 2500/11; B60G 15/12; B60G 2300/12; B60G 2800/162; B62K 25/28; B62K 2025/048; B62K 25/06; B62K 25/283; F16F 9/065; F16F 9/446; F16F 2228/066
USPC ............................................. 188/322.13, 275
See application file for complete search history.

(56) References Cited

U.S. PATENT DOCUMENTS

| | | |
|---|---|---|
| 5,190,126 A | 3/1993 | Curnutt |
| 6,086,060 A | 7/2000 | Berthold et al. |
| (Continued) | | |

OTHER PUBLICATIONS

U.S. Appl. No. 61/143,750, filed Jan. 9, 2009, Andrew Laird et al.

*Primary Examiner* — Thomas J Williams
*Assistant Examiner* — Mariano Sy

(57) ABSTRACT

Altering the damping rate of a vehicle suspension damper. A pressure of a damping fluid is exerted against a second valve mechanism connected to the vehicle suspension damper. The pressure of the damping fluid is increased beyond a threshold of the second valve mechanism that is adjustable by an adjustment member. The adjustment member is exposed through a high pressure side of the vehicle suspension damper. The second valve mechanism is then opened.

2 Claims, 10 Drawing Sheets

Related U.S. Application Data continuation of application No. 12/684,921, filed on Jan. 9, 2010, now Pat. No. 9,108,485.

(60) Provisional application No. 61/143,750, filed on Jan. 9, 2009.

(51) Int. Cl.
| | | |
|---|---|---|
| *B62K 25/06* | (2006.01) | |
| *F16F 9/06* | (2006.01) | |
| *F16F 9/46* | (2006.01) | |
| *B60G 13/08* | (2006.01) | |
| *B62K 25/28* | (2006.01) | |
| *F16F 9/44* | (2006.01) | |
| *B62K 25/04* | (2006.01) | |

(56) References Cited

U.S. PATENT DOCUMENTS

| | | | |
|---|---|---|---|
| 6,135,434 A | 10/2000 | Marking | |
| 6,286,641 B1 | 9/2001 | De Frenne | |
| 6,296,092 B1 | 10/2001 | Marking et al. | |
| 6,360,857 B1 | 3/2002 | Fox et al. | |
| 6,415,895 B2 | 7/2002 | Marking et al. | |
| 6,581,948 B2 | 6/2003 | Fox | |
| 6,604,751 B2 | 7/2003 | Fox | |
| 6,978,872 B2 | 12/2005 | Turner | |
| 7,128,192 B2 | 10/2006 | Fox | |
| 7,163,222 B2 | 1/2007 | Becker et al. | |
| 7,261,194 B2 | 8/2007 | Fox | |
| 7,273,137 B2 | 9/2007 | Fox | |
| 7,308,976 B2 | 12/2007 | Turner | |
| 7,374,028 B2 | 5/2008 | Fox | |
| 7,699,146 B1 * | 4/2010 | Becker | F16F 9/446 188/275 |
| 9,108,485 B2 * | 8/2015 | Laird | B60G 17/08 |
| 9,517,675 B2 * | 12/2016 | Laird | B60G 17/08 |
| 2006/0065496 A1 | 3/2006 | Fox et al. | |
| 2006/0289258 A1 * | 12/2006 | Fox | F16F 9/44 188/322.21 |
| 2007/0012531 A1 | 1/2007 | Fox et al. | |
| 2007/0068751 A1 | 3/2007 | Fox | |
| 2007/0119670 A1 | 5/2007 | Fox | |
| 2007/0158927 A1 | 7/2007 | Fox | |
| 2007/0227844 A1 | 10/2007 | Fox | |
| 2007/0227845 A1 | 10/2007 | Fox | |
| 2007/0228690 A1 | 10/2007 | Fox | |
| 2007/0228691 A1 | 10/2007 | Fox | |
| 2007/0262555 A1 | 11/2007 | Fox | |
| 2007/0296163 A1 | 12/2007 | Fox | |
| 2008/0007017 A1 | 1/2008 | Fox | |
| 2008/0035439 A1 | 2/2008 | Fox | |
| 2008/0053767 A1 | 3/2008 | Fox et al. | |
| 2008/0053768 A1 | 3/2008 | Fox | |
| 2009/0000889 A1 | 1/2009 | McAndrews | |
| 2010/0181709 A1 | 7/2010 | Laird et al. | |

\* cited by examiner

Section A-A

Section A-A

Section B-B

ADJUSTABLE BLOW-OFF SUSPENSION

CROSS-REFERENCE TO RELATED APPLICATIONS

This application is a continuation application of and claims priority to and benefit of co-pending U.S. patent application Ser. No. 14/804,512, filed on Jul. 21, 2015 entitled, "ADJUSTABLE BLOW-OFF SUSPENSION" by Laird et al., assigned to the assignee of the present application, and incorporated herein, in its entirety, by reference.

The application Ser. No. 14/804,512, now issued U.S. Pat. No. 9,517,675 filed on Jul. 21, 2015, is a continuation application of and claims priority to and benefit of U.S. patent application Ser. No. 12/684,921, now issued U.S. Pat. No. 9,108,485 filed on Jan. 9, 2010 entitled, "ADJUSTABLE BLOW-OFF SUSPENSION" by Laird et al., assigned to the assignee of the present application, and incorporated herein, in its entirety, by reference.

The U.S. Pat. No. No. 9,108,485 claims priority to and benefit of U.S. provisional patent application 61/143,750 filed Jan. 9, 2009, now expired, which is incorporated herein, in its entirety, by reference.

FIELD OF THE INVENTION

Embodiments of the invention generally relate to methods and apparatus for use in suspension dampers. Particular embodiments of the invention relate to methods and apparatus useful for adjustable damping rate vehicle suspension. More particular embodiments include a multiple rate damping system that accommodates a selectable value for a system overpressure damping rate.

BACKGROUND

Vehicles, including wheeled vehicles, are typically suspended to absorb shock encountered while traversing uneven terrain. Wheeled vehicles often include one suspension assembly per wheel so that each wheel may absorb shock independently. In many cases each such suspension assembly comprises both a spring portion and a damping portion. The spring portion may consist of a mechanical spring, such as a wound helical spring, or it may comprise a pressurized volume of gas. Gas is often used because it is light weight. Unlike typical simple mechanical springs, gas springs have non-linear spring rates. Compound mechanical springs may also have non-linear rates. A single gas spring has a spring rate that becomes exponential at compression ratios greater than about sixty percent. As a practical matter that can mean that a shock absorber including a gas spring rapidly becomes increasingly stiff just past the middle of its compressive stroke. Such increased stiffness over an extended length of the stroke is often undesirable (e.g. harsh riding vehicle).

In performing the dampening function, the damping mechanism of a shock absorber also creates resistance of the shock absorber to movement (e.g. compression and/or rebound). Unlike the spring which resists based on compressive displacement, fluid dampers usually have resistance to movement that varies with displacement rate (i.e. velocity). Under some circumstances, fluid dampers may not react quickly enough to account for large disparities in the terrain encountered by the vehicle.

What is needed is a shock absorber dampener that offers resistance to movement as desired while becoming compliant to large disparities encountered by the vehicle over rough terrain.

BRIEF DESCRIPTION OF DRAWINGS

The accompanying drawings, which are incorporated in and form a part of this specification, illustrate embodiments of the present technology for methods and apparatus for an adjustable blow-off suspension, and, together with the description, serve to explain principles discussed below.

DESCRIPTION OF EMBODIMENTS

Figure 1:
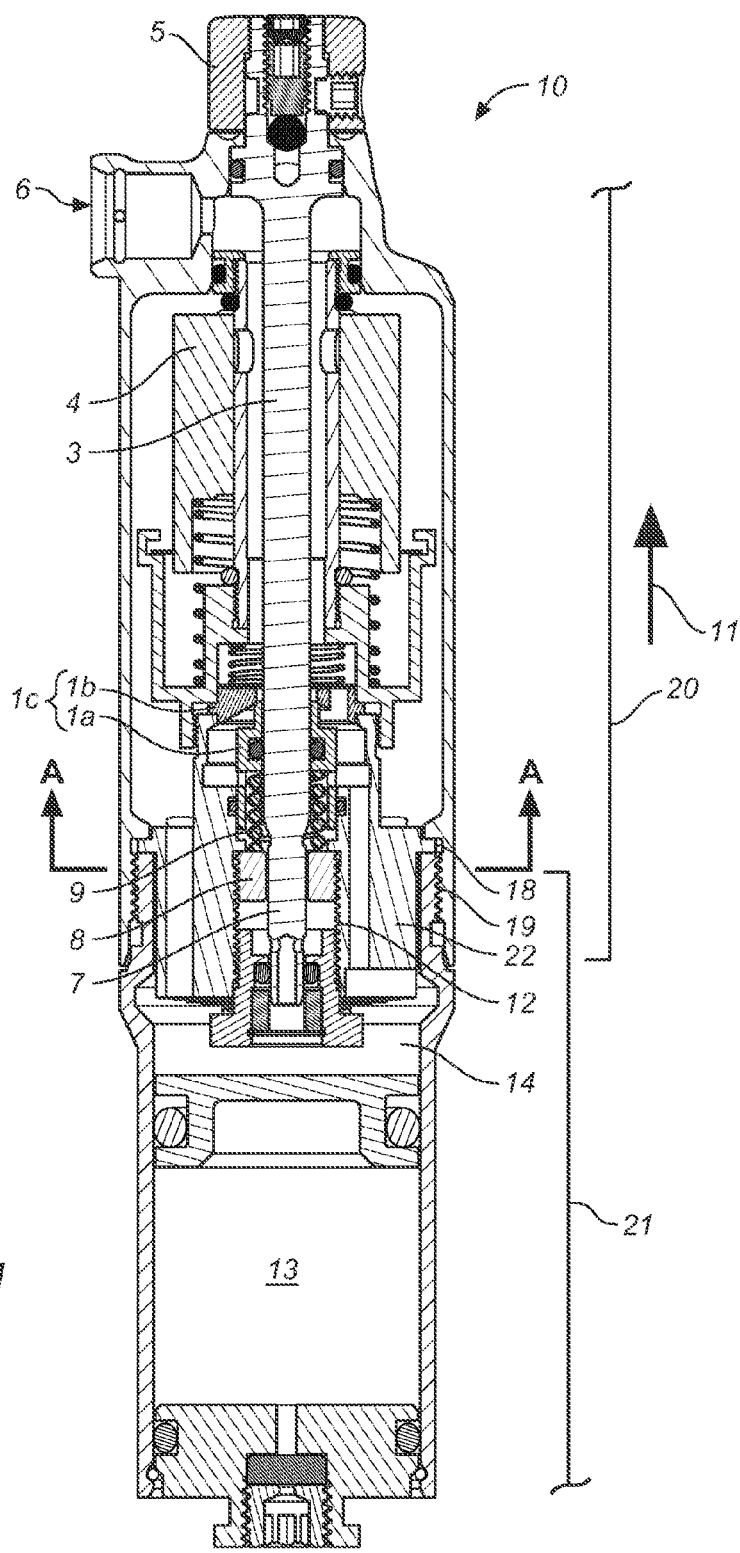
FIG. 1 is a cross-sectional view of a vehicle suspension damper reservoir embodiment as disclosed herein.

One embodiment hereof comprises a gas spring shock absorber for a vehicle. In one embodiment the vehicle is a bicycle. The shock absorber is advantageous because it includes a damper having a manually adjustable blow off valve housed in a remote reservoir. During a compression stroke of the shock absorber, fluid flows from the primary compression/rebound chamber ("main chamber") to the reservoir. In one embodiment the flow is proportional to the volume of a piston rod and the rate of that rod as it enters the compression/rebound chamber. As will be further described herein, a primary valve in the remote reservoir prevents fluid inflow from the main chamber (thereby, in one embodiment, maintaining the shock in a "locked out" condition) until the rear wheel encounters a disparity in the terrain being traversed by the bicycle (or other vehicle). In one embodiment the primary valve is an inertia valve. Occasionally however, a large disparity may be encountered before the primary valve can fully react. The manually adjustable portion of the damping function allows a user to adjust a pressure relief valve, or "blow-off" valve (examples of "second valve"), threshold which when exceeded allows damping fluid to flow into the reservoir while bypassing the primary valve. It allows the user to establish a damping fluid pressure threshold, in one embodiment, for blow-off whereby such threshold is increased or decreased selectively. A bicycle rider for example may choose to set a fairly high threshold for the function of compression damping blow off (by adjusting and increasing the seating force of the blow off valve member against the blow off seat, for example, as discussed below) in order to ensure that the suspension retains a good pedaling anti-bob or "platform" characteristic. In one embodiment, the suspension features hereof are on a bicycle or motorcycle shock or fork.

U.S. Pat. No. 7,163,222, which patent is herein incorporated by reference in its entirety, shows and describes certain variations of "blow-off" and lock out features. U.S. Pat. No. 7,374,028, which patent is herein incorporated by reference in its entirety, shows and describes certain variations of a remote reservoir shock absorber. U.S. Pat. No. 7,273,137, which patent is herein incorporated by reference in its entirety, shows and describes certain variations of inertia valves and FIG. 5 shows an inertia valve integrated with a remote reservoir. Optionally, any of the foregoing mechanisms may be integrated, or used in combination, with any other features disclosed herein.

U.S. Pat. No. 6,135,434, which patent is herein incorporated by reference in its entirety, shows certain variations of positive and negative spring mechanisms. Another selectively variable damping mechanism is shown in U.S. Pat. No. 6,360,857 which patent is herein incorporated by reference in its entirety. Optionally, any of the foregoing mechanisms may be integrated, or used in combination, with any other features disclosed herein.

U.S. Pat. Nos. 6,415,895, 6,296,092, 6,978,872 and 7,308,976, each of which patents is herein incorporated by reference in its entirety, show certain variations of position sensitive damping mechanisms. Another position sensitive damping mechanism is shown in U.S. Pat. No. 7,374,028 which patent is herein incorporated by reference in its entirety. Another position sensitive damping mechanism is shown in U.S. Pat. No. 5,190,126 which patent is herein incorporated by reference in its entirety. Optionally, any of the foregoing mechanisms may be integrated, or used in combination, with any other features disclosed herein.

U.S. Pat. Nos. 6,581,948, 7,273,137, 7,261,194, 7,128,192, and 6,604,751, each of which patents is herein incorporated by reference in its entirety, show certain variations of inertia valve mechanisms for controlling aspects of compression damping. Additionally, U.S. Published Patent Application Nos. 2008/0053768 A1, 2008/0053767 A1, 2008/0035439 A1, 2008/0007017 A1, 2007/0296163 A1, 2007/0262555 A1, 2007/0228691 A1, 2007/0228690 A1, 2007/0227845 A1, 2007/10227844 A1, 2007/0158927 A1, 2007/10119670 A1, 2007/0068751 A1, 2007/0012531 A1, 2006/0065496 A1, each of which patent applications is herein incorporated by reference in its entirety, show certain variations of inertia valve mechanisms for controlling aspects of compression damping. Optionally, any of the foregoing inertia valve mechanisms or other features may be integrated, or used in combination, with any other features disclosed herein. A shock absorber or fork may be equipped, for example, with an inertia valve for controlling an aspect of damping and a position sensitive valve for controlling another aspect of damping.

FIGS. 1, 2, 3, 4, 5a-5e and 6 show embodiments of a vehicle suspension damper reservoir housing 10. For reference herein, the general "up", "above" or "top" direction is indicated by arrow 11. The "below", "bottom" or "down" direction is opposite generally of that indicated by arrow 11. The shock absorber reservoir includes a second valve mechanism 1c having an adjustment member 5 on the fluid inlet 6 (e.g. high pressure or compression pressure) end or side of the vehicle suspension damper reservoir housing 10. That is advantageous in combination with a reservoir contained primary valve mechanism 4 because it allows the adjustment member 5 to be located on the upper end of the vehicle suspension damper reservoir 10. The inertia valve reservoir is typically mounted so that the primary valve mechanism 4 opens when the vehicle to which it is mounted is acted upon by an impact from below (see FIG. 5e). As such, an adjustment member 5 for the second valve mechanism 1c threshold is conveniently (for easy access and manual manipulation) located on the side of the fluid inlet 6 of the primary valve mechanism 4 only if the actuator 3 traverses through the primary valve mechanism 4 (because the second valve mechanism 1c is conveniently located in parallel with the primary valve mechanism 4).

Figure 2:
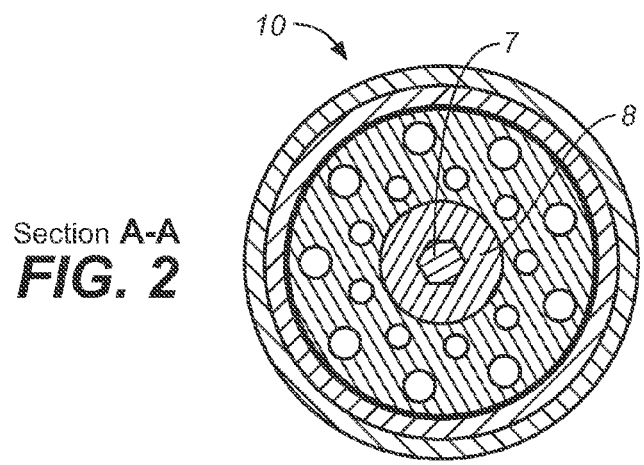
FIG. 2 is a top view of the cross sectionally hex shaped end 7 and nut 8 of FIG. 1 embodiment as disclosed herein.
Figure 4:
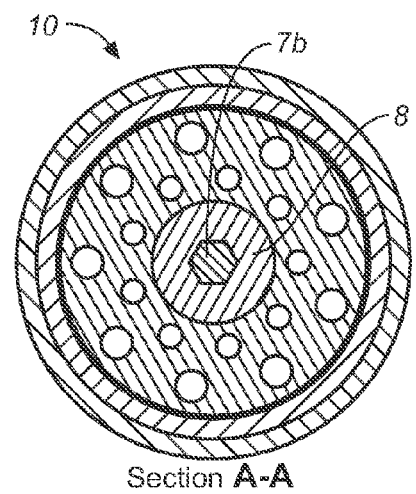
FIG. 4 is a top view of the cross sectionally hex shaped end 7a and nut 8 of FIG. 3 embodiment as disclosed herein
Figure 4:
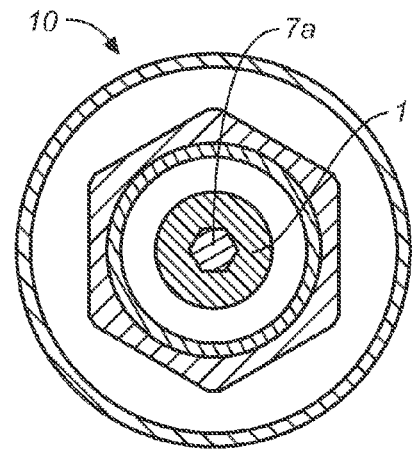
Figure 3:
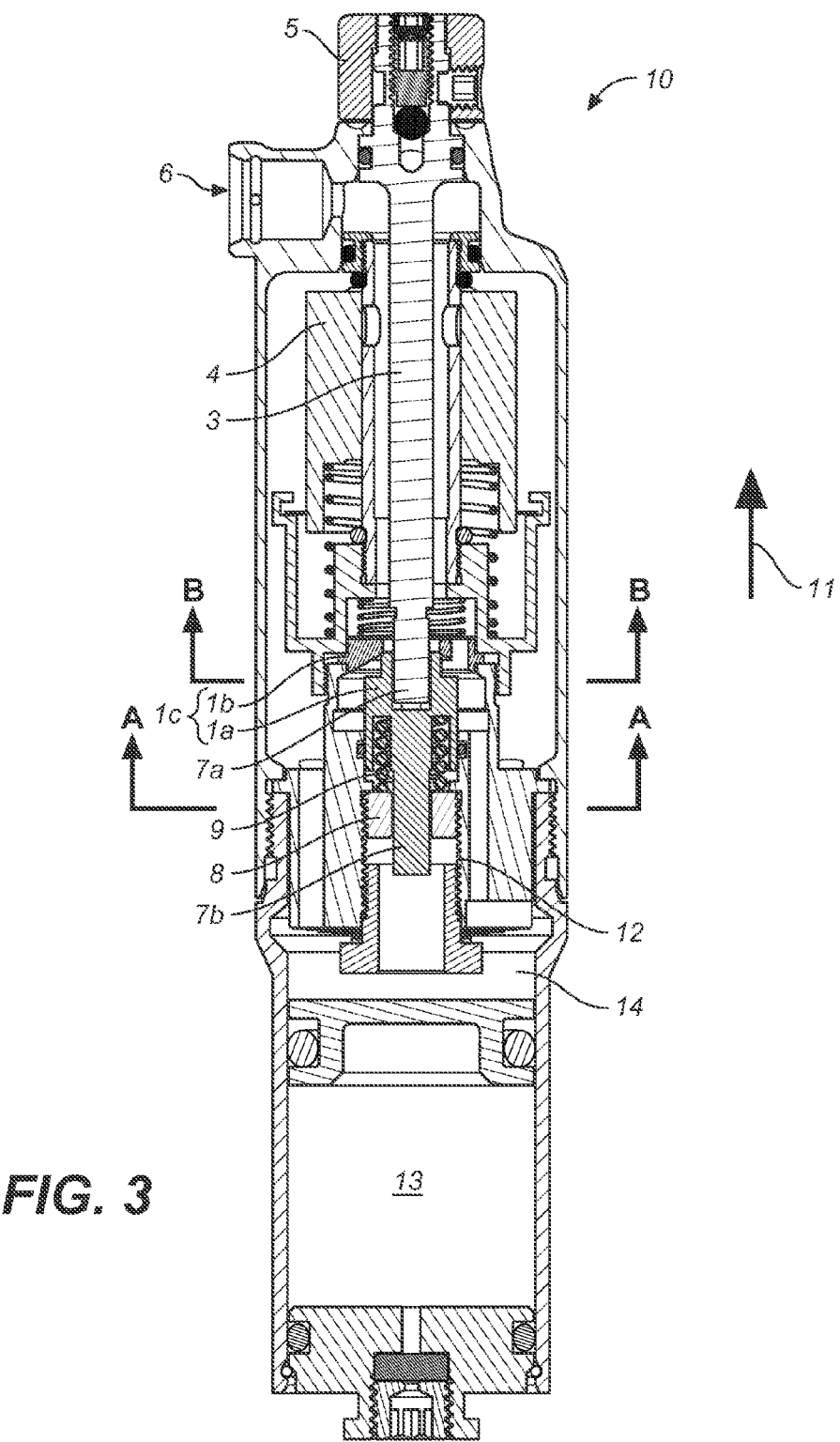
FIG. 3 is a cross-sectional view of a vehicle suspension damper reservoir embodiment as disclosed herein.
Figure 5A:
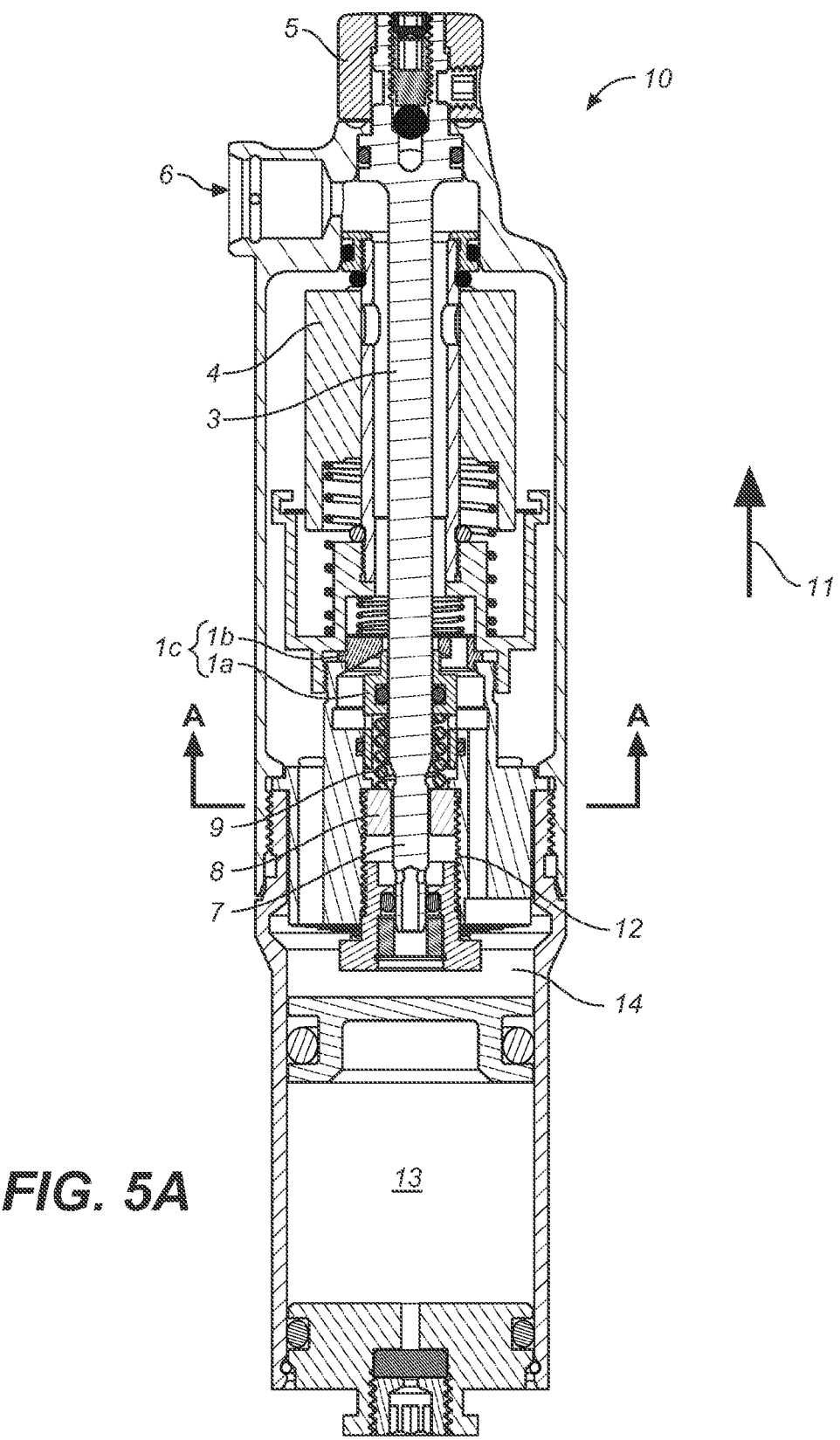
FIG. 5a is a cross-sectional view of a vehicle suspension damper reservoir embodiment as disclosed herein.

FIGS. 1, 3, 5a-e and 6 show a vehicle suspension damper reservoir housing 10 having an adjustment member 5 mounted on an upper end thereof. The adjustment member 5 is fixed to an actuator 3. Rotation of the adjustment member 5 results in rotation of the actuator 3. FIGS. 1 through 5a show an embodiment wherein the actuator 3 includes a cross sectionally hex shaped end 7 (7a in FIGS. 3 and 4). The cross sectionally hex shaped end 7 or 7a is engaged with and is axially movable relative to either nut 8, as shown in FIGS. 1, 2 and 5a, or second valve mechanism 1c as shown in the FIGS. 3 and 4 (Section B-B). The second valve mechanism 1c of FIGS. 3, 4, 8 and 9 (Section A-A) further includes an additional hex cross section portion 7b that engages and is axially movable relative to nut 8.

In all of FIGS. 1-5e, the axial position of nut 8 determines the compression force in spring 9, the corresponding second valve mechanism 1c to valve seat force, and hence the blow off threshold of second valve mechanism 1c. A general operation of the embodiments shown in those Figures follows. During a compression stroke of the shock absorber (not shown) fluid is displaced from the main chamber (not shown) and will flow there from toward fluid inlet 6. Absent an opening of the primary valve mechanism 4 the displaced fluid will build pressure down through the center shaft (surrounding the actuator 3 and subject to dimensional changes due to such pressure change; however the particular floating assembly facilitated by the two piece 20, 21 housing assembly alleviates any affect due to such dimensional change) and against an upper end of second valve mechanism 1c (ultimately upon opening of second valve mechanism 1c to flow toward reservoir chamber 14 which fluid pressure is determined by compressible gas pressure charge in compressible chamber 13). Spring 9 maintains second valve mechanism 1c closed against such fluid pressure until that fluid pressure exerted over the area of second valve mechanism 1c results in a force that is greater than the spring 9 force. When that occurs, the second valve mechanism 1c opens and "blow-off "or primary valve mechanism bypass occurs.

In order that a user may selectively adjust the blow off pressure value for the shock absorber, an adjustment member 5 is provided near an upper end of vehicle suspension damper reservoir housing 10. Such a location makes the adjustment member 5 readily accessible to a user and easy to use versus an adjustment member that might be provided below the reservoir. Rotation of the adjustment member 5 (e.g. manually) causes proportional rotation of the actuator 3 and cross sectionally hex shaped end 7. The cross sectionally hex shaped end 7 either directly rotates nut 8 (by hex cross section engagement therewith) or it rotates second valve mechanism 1c which in turn (via its hex cross section portion 7b) rotates nut 8. It is noted that the cross section at cross sectionally hex shaped end 7 may be star shaped or cam shaped or any other suitable shape for transmitting rotational movement. As nut 8 is rotated, it is moved axially relative to valve seat 1b by means of its engagement with threads 12. As an example assuming threads 12 are right hand, counterclockwise (from above) rotation of adjustment member 5 will move nut 8 closer to valve seat 1b, increasing the compression of spring 9 and thereby increasing the fluid pressure required to open second valve mechanism 1c and therefore increasing the blow-off pressure. Conversely, if threads 12 are left hand, clockwise rotation of adjustment member 5 will move nut 8 closer to valve seat 1b resulting in an increased opening pressure ("crack pressure") requirement. In each of the foregoing examples clockwise and counterclockwise, respectively for each, rotation of adjustment member 5 will decrease the crack pressure or blow off pressure. Note that the embodiments of FIGS. 3 and 4 eliminate the need for a seal on the inner diameter surface of second valve mechanism 1c but add the need for a double hex rotation feed through arrangement.

Referring now to FIG. 5a, in one embodiment, the vehicle suspension damper reservoir housing 10 for providing a variable damping rate comprises a second valve mechanism 1c having a first threshold pressure that is selectively variable via an adjustment member 5. The adjustment member 5 is exposed through a high pressure side of the vehicle suspension damper reservoir housing 10. Exceeding the first threshold pressures causes the second valve mechanism 1c to open and allow damping fluid to flow there through to reservoir chamber 14. A compressible chamber 13 (e.g. gas filled) is in communication with the reservoir chamber 14. A portion of a stroke of the vehicle suspension damper reservoir housing 10 compresses a volume of the compressible fluid within the compressible chamber 13 and an ambient pressure of the damping fluid increases in proportion to the compression of the compressible volume. In one embodiment, a vehicle suspension includes an air spring that includes an air cylinder 28 and an air piston 29 and an air rod assembly 30. In one embodiment, the vehicle suspension includes a damper that includes a cylinder 25 and a piston 26 and a rod assembly 27, wherein at least a portion of the damper includes at least a portion of the air spring.

In one embodiment, the second valve mechanism 1c comprises a blow-off valve 1a and a valve seat 1b. Additionally, in one embodiment the vehicle suspension damper reservoir housing 10 comprises a primary valve mechanism 4 having an impulse force threshold (e.g. axially applied impulse force overcomes force of spring coaxially positioned under primary valve 4), wherein exceeding said impulse force threshold causes said primary valve mechanism 4 to open and allow damping fluid to flow there through to said reservoir chamber 14.

Referring still to FIG. 5a, in one embodiment the vehicle suspension damper reservoir housing 10 comprises: an actuator 3 that is rotationally coupled with the adjustment member 5; and a nut 8 that is rotationally coupled with the actuator 3 and interfacing with a spring 9 (one example of an adjuster assembly). The spring 9 interfaces with the second valve mechanism 1c. In one embodiment, the spring 9 axially abuts and exerts a closure force on a blow-off valve 1a (relative to a valve seat 1b) of the second valve mechanism 1c.

Figure 6:
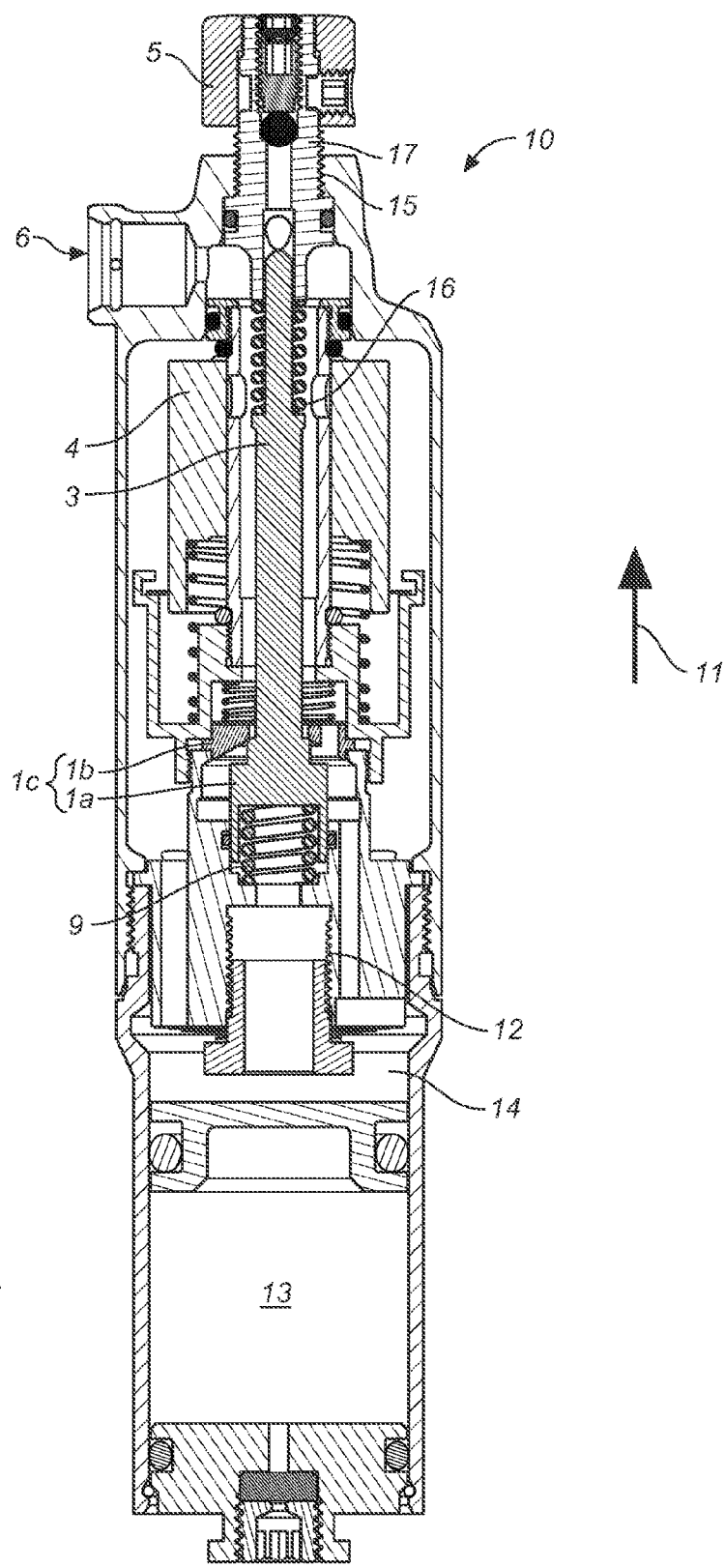
FIG. 6 is a cross-sectional view of a vehicle suspension damper reservoir embodiment as disclosed herein.

Referring now to FIG. 6, in yet another embodiment, the vehicle suspension damper reservoir housing 10 comprises: an adjuster 17 that is rotationally coupled with the adjustment member 5; and a spring 16 that interfaces (e.g. axially abuts each) with the adjuster 17 and an actuator 3 (one example of an adjuster assembly). The actuator 3 is positioned to be in contact with the second valve mechanism 1c (and includes valve member 1a). In one embodiment, the actuator 3 is configured to comprise a blow-off valve member 1a of the second valve mechanism 1c.

Figure 5B:
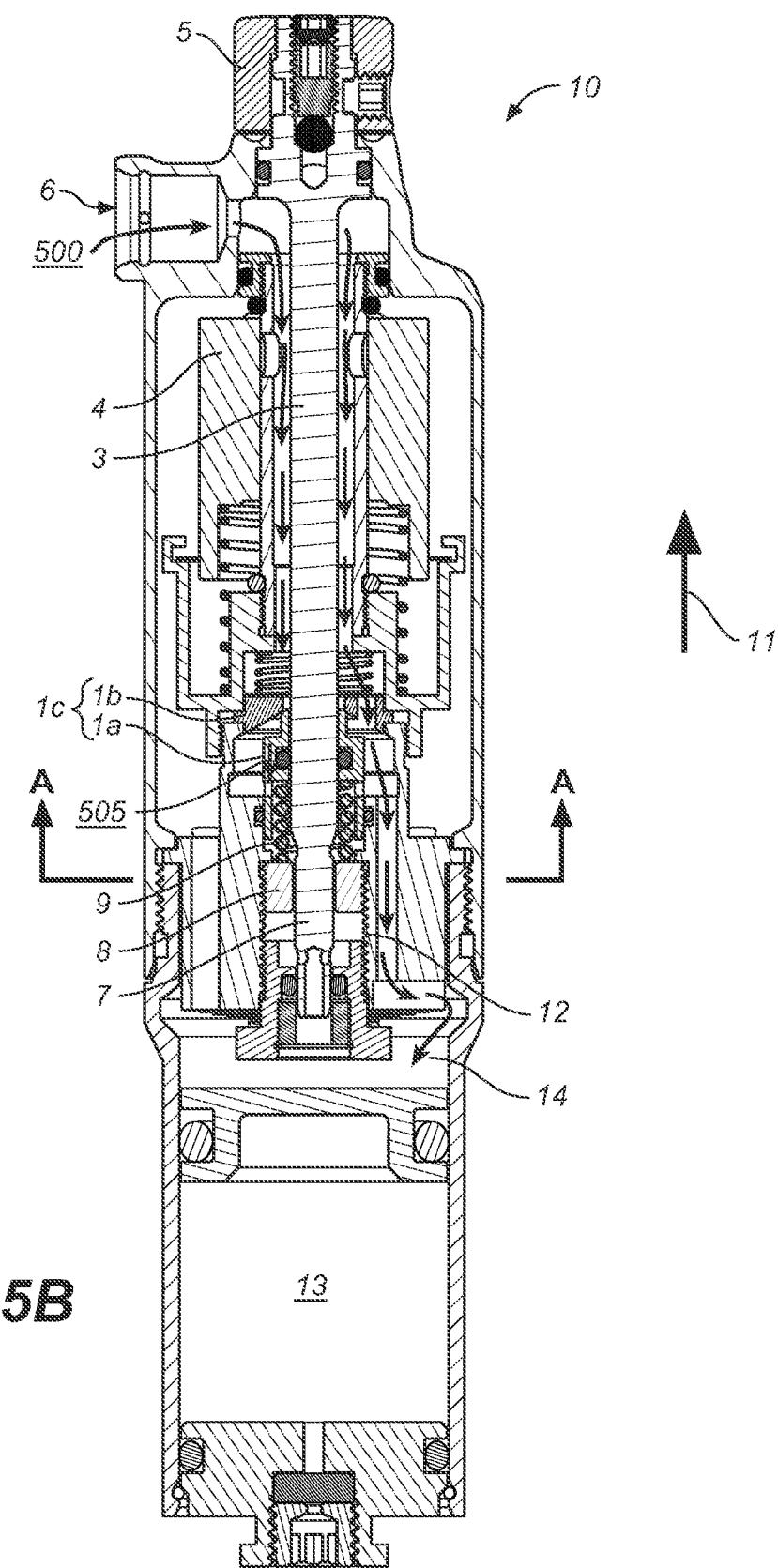
FIG. 5b is a cross-sectional view of a vehicle suspension damper reservoir embodiment showing the flow of damping fluid from a reservoir external to the vehicle suspension damper reservoir to a reservoir internal to the vehicle suspension damper reservoir as disclosed herein.

Referring now to FIG. 5b, an embodiment of a sectional view of a vehicle suspension reservoir showing (by arrows) the flow 500 of damping fluid from a damper cylinder external to the vehicle suspension reservoir housing 10 to a reservoir of the vehicle suspension damper reservoir housing 10 during the compression of a shock is shown. As shown, the damping fluid enters the fluid inlet 6, past the primary valve mechanism 4, and provides damping fluid pressure against the blow-off valve 1a of the second valve mechanism 1c. If enough damping fluid pressure is provided against the blow-off valve 1a such that a compression force of spring 9 is overcome, then blow-off valve 1a opens. The damping fluid then flows alongside nut 8 to the reservoir chamber 14 (thereby compressing compressible chamber 13 through movement of the floating piston).

Figure 5C:
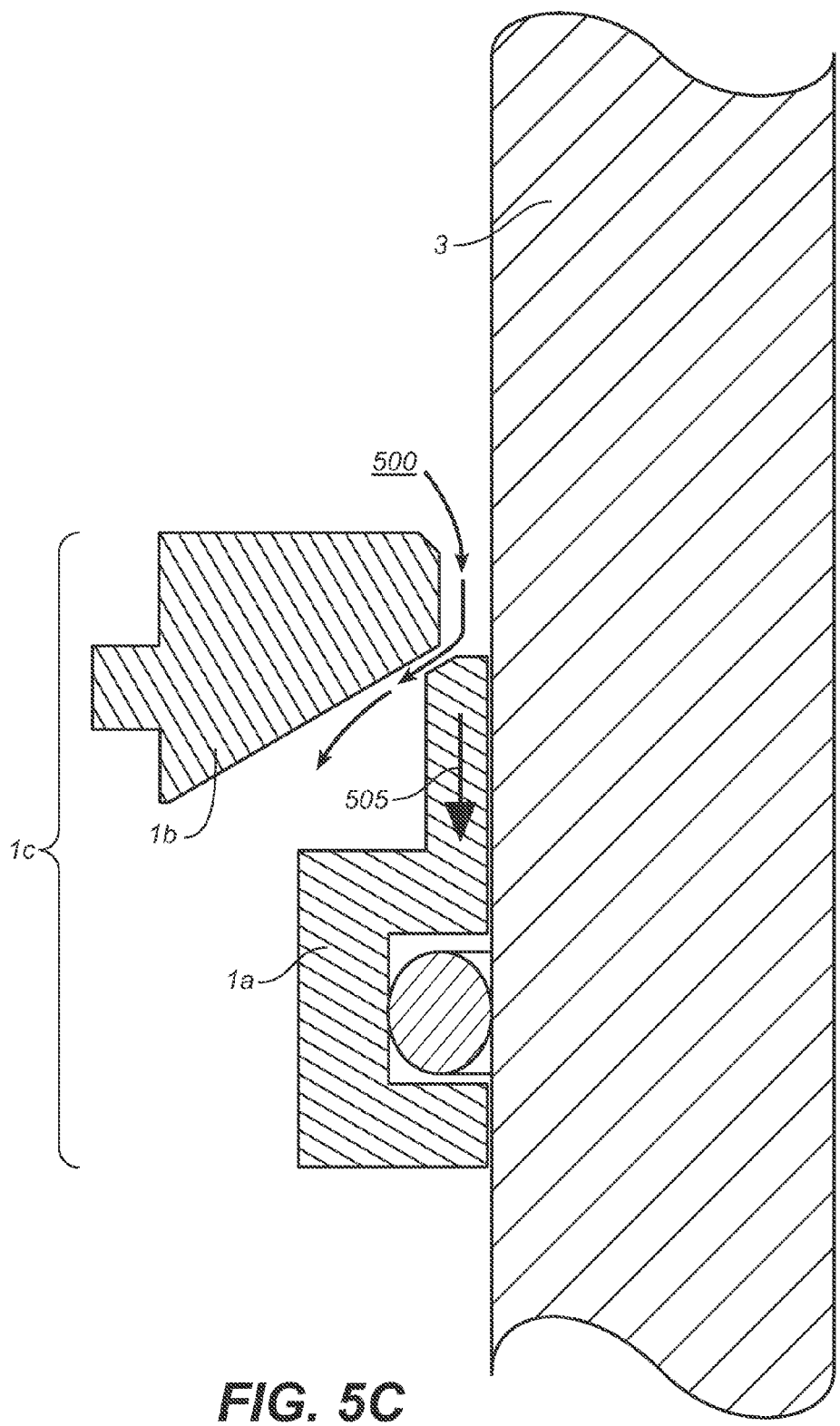
FIG. 5c is an enlarged view of a second valve mechanism embodiment as disclosed herein.

Referring now to FIG. 5c, an enlarged view of the second valve mechanism 1c embodiment is shown. As can be seen, the flow 500 of the damping fluid provides pressure against blow-off valve 1a. When this pressure overcomes a predetermined threshold, then the blow-off valve 1a opens in the direction 505 approximately opposite the pressure caused by the flow 500 of the damping fluid. Then, the damping fluid continues to flow through vehicle suspension damper reservoir housing 10 to the reservoir chamber 14.

Figure 5D:
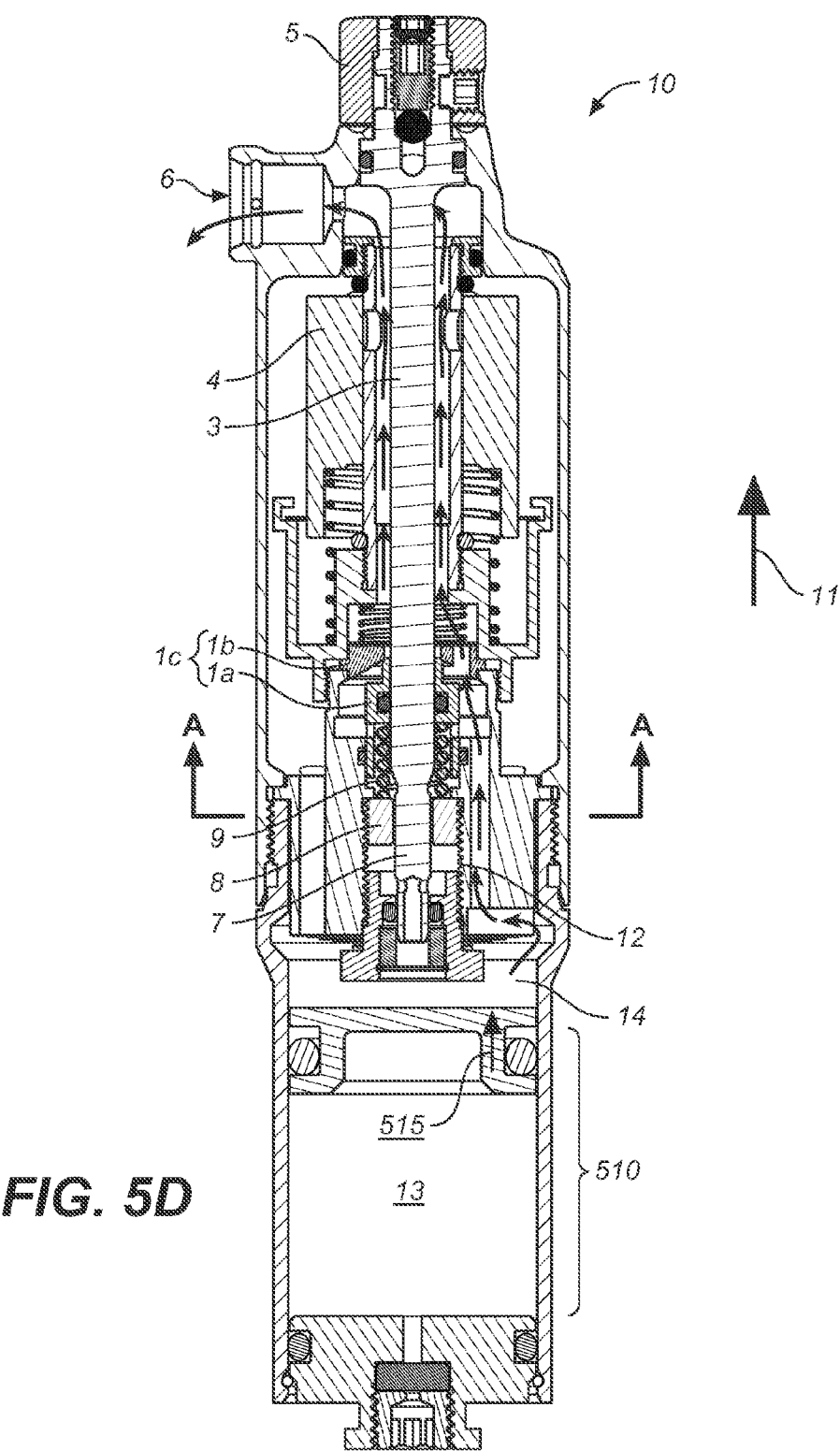
FIG. 5d is a cross-sectional view of a vehicle suspension damper reservoir housing 10 embodiment showing the flow of damping fluid from a reservoir internal to the vehicle suspension damper reservoir to a reservoir external to the vehicle suspension damper reservoir as disclosed herein.

Referring now to FIG. 5d, an embodiment of a sectional view of a vehicle suspension damper reservoir housing 10 showing (by arrows) the flow of damping fluid from a reservoir of the vehicle suspension damper reservoir housing 10, out through fluid inlet 6, to a damping compression chamber (not shown) during the extension of a shock is shown. While the floating piston 515 is moving upwards 11, damping fluid flows from the reservoir chamber 14 upwards through the annular area running in parallel on both sides of the actuator 3. The damping fluid continues to flow upwards toward the fluid inlet 6, using substantially the same pathways that were used in FIG. 5b during the compression of a shock.

Of note, if the primary valve mechanism 4 is open, then the damping fluid pressure may not reach the threshold state because often the damping fluid has found another pathway in which to flow through vehicle suspension damper reservoir housing 10, towards the reservoir chamber 14.

Figure 5E:
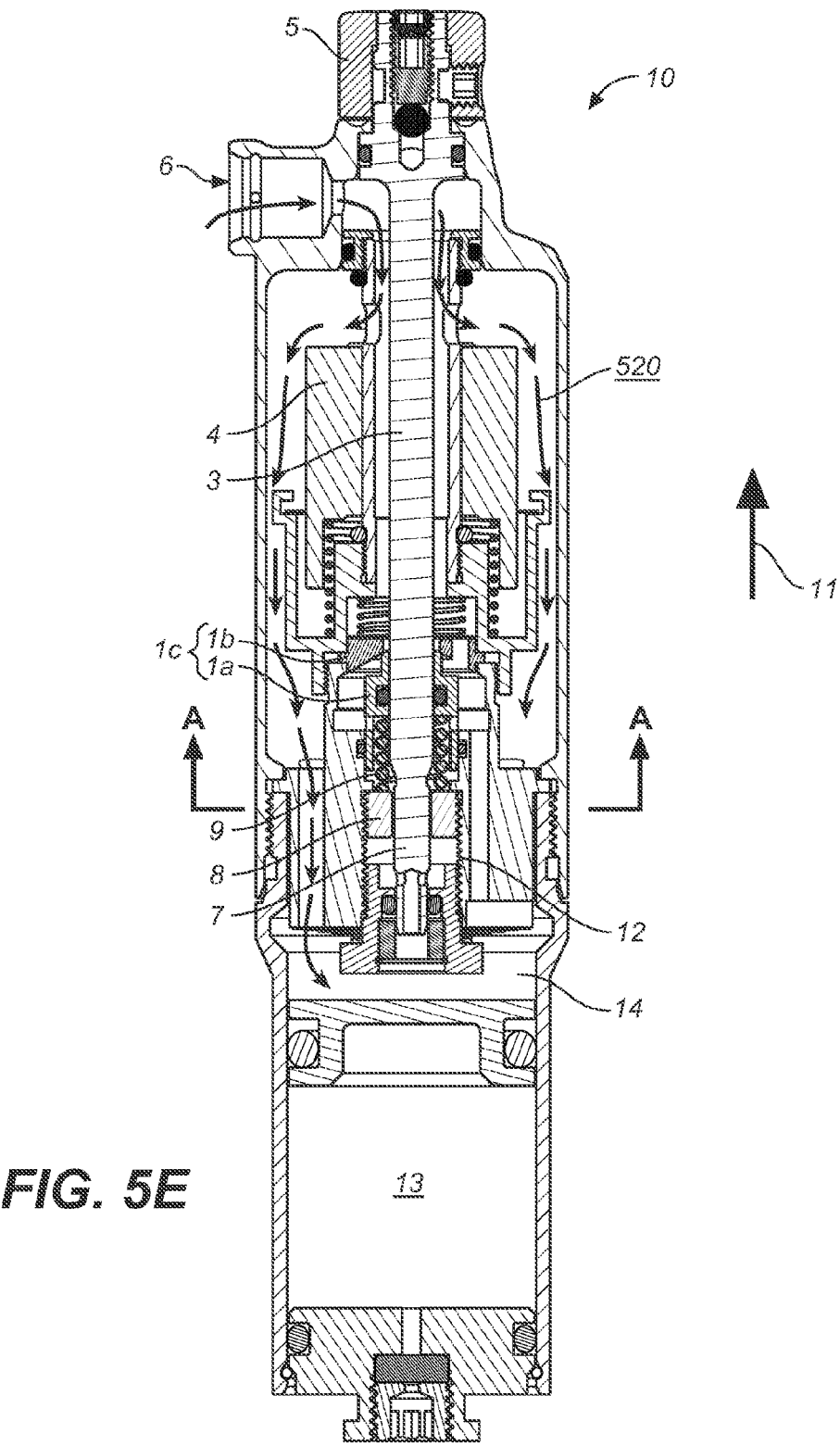
FIG. 5e is a cross-sectional view of a vehicle suspension damper reservoir embodiment showing the flow of damping fluid when the second valve mechanism is open as disclosed herein.

For example and referring to FIG. 5e, an embodiment of a sectional view of a vehicle suspension damper reservoir housing 10 showing (by arrows) the flow of damping fluid when the primary valve mechanism 4 is open is shown as disclosed herein. As shown, the damping fluid flows into the reservoir from the fluid inlet 6 and through the open primary valve mechanism 4. Primary valve mechanism 4 opens in response to an impulse (typically imparted by an encountered disparity in the terrain), and allows the damping fluid to pass through an annular chamber 520 surrounding the actuator 3, towards the reservoir chamber 14.

Of note, in one situation, a vehicle may hit a bump, thereby causing the primary valve mechanism 4 to open. While the damping fluid flows through the vehicle suspension damper reservoir housing 10 as described herein, the primary valve mechanism 4 slowly closes according to a timing shim. However, if the vehicle hits another bump during the time in which the primary valve mechanism 4 is closing, the second valve mechanism 1c may be opened by pressure buildup, thereby allowing damping fluid to flow through as described herein. Such function mitigates any disruption in the operation of the damper due to the effect (e.g. erratic oscillation of the primary valve member) of hitting bumps rapidly in succession.

In another situation, the weight of the rider of the vehicle may in fact cause the damping fluid pressure to overcome the predetermined threshold pressure necessary to open the second valve mechanism 1c.

Figure 7:
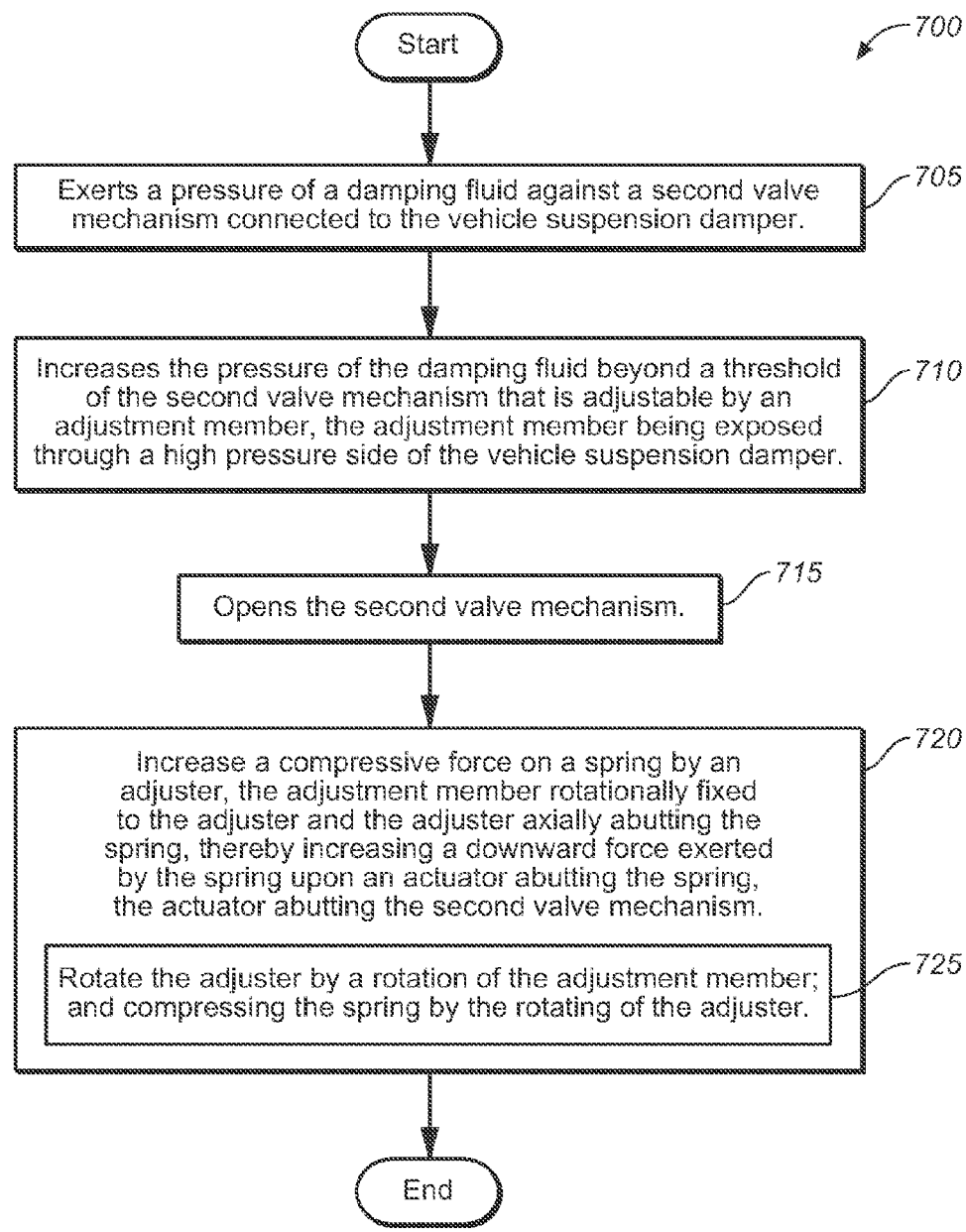
FIG. 7 are a combined flowchart 700 of an example method for altering the damping rate of a vehicle suspension damper as disclosed herein.

Referring now to FIGS. 7, a flow chart 700 of a method for altering the damping rate of a vehicle suspension damper is shown, in accordance with embodiments of the present technology is shown. Referring now to FIGS. 5a and to 705 of FIG. 7, in one embodiment, a pressure of a damping fluid is exerted against a second valve mechanism 1c connected to the vehicle suspension damper reservoir housing 10.

Referring now to FIGS. 5a and to 710 of FIG. 7, in another embodiment, the pressure of the damping fluid increases beyond a threshold of the second valve mechanism 1c that is adjustable by the adjustment member 5. The adjustment member 5 is exposed through a high pressure side of the vehicle suspension damper reservoir housing 10.

Referring now to FIG. 5a and to 715 of FIG. 7, in one embodiment the second valve mechanism 1c opens. In one embodiment, the opening of the second valve mechanism 1c is in response to the increase of the pressure of the damping fluid beyond the threshold of the second valve mechanism described in 710 of FIG. 7. In one embodiment, the second valve mechanism 1c opens between 0.010 and 0.020 inches.

Referring now to FIG. 6 and to 720 of FIG. 7, in one embodiment, a compressive force on a spring 16 by rotation of an adjuster 17 (via rotation of adjustment member 5) is increased. As adjuster 17 is rotated, it is translated axially by corresponding relative rotation within the threaded interface 15. Such axial translation depends on the sense of the threaded interface. For example, a right hand rotation of adjustment member 5, with right hand threads 15 will result in a downward axial translation of adjuster 17 and a corresponding increase in compression of spring 16. Conversely, a right hand rotation of adjustment member 5, with left hand threads 15 will result in an upward axial translation of adjuster 17 and a corresponding decrease in compression of spring 16. It is noteworthy that in the shown embodiment the actuator 3 and adjuster 17 are axially and rotationally movable relative to one another. The adjustment member 5 is rotationally fixed to the adjuster 17 and the adjuster 17 axially abuts the spring 16, thereby increasing a downward force exerted by the spring 16 upon an actuator 3 that abuts the spring 16. The actuator 3 also abuts the valve seat 1b of the second valve mechanism 1c. In one embodiment and referring to 1065 of FIG. 10b, the adjuster 17 is rotated by the rotation of the adjustment member 5. The spring 16 is then compressed by the rotating of the adjuster 17.

Referring now to FIG. 5a, in one embodiment an ambient pressure of the damping fluid is increased in proportion to the increase of the pressure of the damping fluid beyond a threshold described in 710 of FIG. 7.

Referring now to FIG. 5a, in one embodiment an actuator 3 that is rotationally coupled with the adjustment member 5 is rotated. In one embodiment, a nut 8 is rotated through the rotating of the actuator 3. The nut 8 is configured to be in contact with the actuator 3. In one embodiment, a spring 9 is compressed by the rotating 1035 of the nut 8, the spring 9 configured to be in contact with the nut 8 and a portion of the second valve mechanism 1c. In one embodiment, the "portion" of the second valve mechanism 1c refers to the blow-off valve 1a.

Referring still to FIG. 5a, in one embodiment a portion of the second valve mechanism 1c that is configured to be in contact with the actuator 3 and a nut 8 is rotated. In another embodiment, the nut 8 is rotated by the rotating of the portion of the second valve mechanism 1c. The nut 8 is configured to be in contact with the actuator 3. In one embodiment, the "portion" of the second valve mechanism 1c refers to the blow-off valve 1a.

Referring now to 5e, in one embodiment a portion of the flowing damping fluid is flowed toward and through the vehicle suspension damper reservoir housing 10 of the vehicle suspension damper. In one embodiment, damping fluid flows towards the reservoir chamber 14 of the vehicle suspension damper reservoir housing 10. In one embodiment, the primary valve mechanism 4 then opens in response to an impulse imparted to the primary valve mechanism 4.

In one embodiment the valve seat 1a is integral with the actuator 3. Actuator 3 and valve seat 1a are held in axial abutment with valve seat 1b by a force exerted by compressed seating force of spring 9. The compression force of spring 9 is axially imparted in an upward direction to actuator 3 at a lower end and the compression force of spring 16 is axially imparted in a downward direction to actuator 3 proximate an upper end. Rotation of adjustment member 5 and corresponding rotation of adjuster 17 alter the compressive forces in spring 16 and as a result in spring 9. The ratio of force resolution between the springs 16 and 9 is dependent of the spring rate of each spring. In one embodiment spring 16 is somewhat lighter than spring 9 and has a correspondingly lower spring rate. As such, when spring 16 is compressed axially, such compression only effects a relatively fractional axial compression of spring 9. Such a configuration has the effect of increasing adjustment sensitivity (hence resolution) of the blow-off threshold setting. As spring 9 is compressed, the seating force between valve seat 1a and seat 1b is reduced and so also is the "blow-off" threshold setting of the second valve mechanism 1c.

Referring now to FIG. 5d and to 1075 of FIG. 10b, in one embodiment, damping fluid flows toward a reservoir external to the vehicle suspension damper compression chamber (not shown). In one embodiment, the volume of the compressible fluid is decompressed through a portion of the stroke of the vehicle suspension damper. In another embodiment, the pressure of said damping fluid is decreased in proportion to the compression. Then, in one embodiment, the second valve mechanism 1c is closed. In one embodiment, this closure is in response to the decreased ambient pressure.

FIG. 6 shows embodiments that do not include hex cross section rotation transfer interfaces. Those embodiments operate generally as follows. Adjustment member 5 is rotationally fixed to adjuster 17, which in turn is engaged by threads 15 in the upper end of vehicle suspension damper reservoir housing 10. The lower end of adjuster 17 axially abuts spring 16 and maintains a compressive force therein. The description example herein assumes that threads 15 are right hand. Clockwise rotation (from above) of adjustment member 5 correspondingly rotates adjuster 17 which in turn moves axially downward due to the threads 15. As adjuster 17 moves downward it further compresses spring 16, which increases the downward force exerted by spring 16 upon actuator 3. In the embodiment of FIG. 6, actuator 3 and second valve mechanism 1c are integral so that a downward force on actuator 3 tends to open second valve mechanism 1c. In practice, the greater the force exerted on actuator 3 by spring 16, the lower the pressure through fluid inlet 6 is required to open the second valve mechanism 1c (because the force exerted on the second valve mechanism 1c by the pressure through fluid inlet 6 and by the spring 16 are additive) and thereby to blow-off. The second valve mechanism 1c is maintained in engagement with valve seat 2 by spring 9.

Another feature of many shown embodiments is the spilt reservoir housing and valve retention mechanism. An exemplary embodiment is shown in FIG. 1. The vehicle suspension damper reservoir housing 10 is split and includes an upper portion 20 threaded to a lower portion 21. Valve body bulk head 22 includes tab or radial flange 18 which is captured between threaded parts 20 and 21 when assembled. Advantageously, the inner valve assembly can be placed inside the upper portion 20 and retained therein by the valve body bulk head 22 and the inner diameter of the lower portion 21 need not be so large as to accommodate the passing through of all of the inner valve mechanism. The entire reservoir may be assembled and connected with only one set of threads thereby reducing the number of connection points and decreasing the tolerance sensitivity between internal parts and respective housings 20 and 21. Further, internal parts such as the primary valve mechanism 4 center shaft (not numbered) may "float" in response to changes in reservoir internal pressure because such parts are not axially restrained as they may otherwise be were a standard threaded top cap assembly employed.

While the foregoing is directed to embodiments of the present invention, other and further embodiments of the invention may be implemented without departing from the scope of the invention, and the scope thereof is determined by the claims that follow.

What is claimed is:

1. A vehicle suspension damper for providing a variable damping rate comprising:
    a main chamber; and
    a damper reservoir coupled to said main chamber, said damper reservoir having an upper end and a lower end, said damper reservoir comprising:
        a reservoir chamber;
        a compressible chamber in communication with said reservoir chamber;
        a valve mechanism that opens at a threshold pressure to allow fluid to flow from said main chamber to said reservoir chamber;
        an adjustment member coupled with said valve mechanism to selectively vary said threshold pressure, said adjustment member disposed near said upper end of said damper reservoir;
        an actuator coupled with said adjustment member;
        a nut coupled with said actuator; and
        a spring interfacing with said nut.
2. The vehicle suspension damper of claim 1, wherein said actuator is positioned to be in contact with said valve mechanism.

* * * * *